US012584328B2

(12) United States Patent
Katz

(10) Patent No.: US 12,584,328 B2
(45) Date of Patent: Mar. 24, 2026

(54) MODULAR FENCE ASSEMBLY

(71) Applicant: PLASSON LTD., Kibbutz Maagan Michael (IL)

(72) Inventor: Oded Katz, Kibbutz Maagan Michael (IL)

(73) Assignee: PLASSON LTD., Kibbutz Maagan Michael (IL)

( * ) Notice: Subject to any disclaimer, the term of this patent is extended or adjusted under 35 U.S.C. 154(b) by 246 days.

(21) Appl. No.: 18/017,045

(22) PCT Filed: Aug. 11, 2021

(86) PCT No.: PCT/IL2021/050981
§ 371 (c)(1),
(2) Date: Jan. 19, 2023

(87) PCT Pub. No.: WO2022/034590
PCT Pub. Date: Feb. 17, 2022

(65) Prior Publication Data
US 2023/0292700 A1      Sep. 21, 2023

Related U.S. Application Data

(60) Provisional application No. 63/064,058, filed on Aug. 11, 2020.

(51) Int. Cl.
*E04H 17/18* (2006.01)
*A01K 31/22* (2006.01)

(52) U.S. Cl.
CPC ............. *E04H 17/18* (2013.01); *A01K 31/22* (2013.01); *E04H 17/185* (2021.01)

(58) Field of Classification Search
CPC ... E04H 17/18; E04H 17/185; E04H 17/1602; A01K 1/0029; A01K 31/22; E01F 13/022
See application file for complete search history.

(56) References Cited

U.S. PATENT DOCUMENTS 1,749,000 A * 3/1930 Scheeler ................. E04H 17/18
256/1
3,820,909 A 6/1974 Schindler et al.
(Continued)

FOREIGN PATENT DOCUMENTS

DE      4031781 A1    4/1991
EP      2431527 A1    3/2012
(Continued)

OTHER PUBLICATIONS

Sephnos, "Evolution Anti-Migration Fence", Online at: https://www.sephnos.com/s/FT-Evolution_IN-7ft3.pdf, Nov. 22, 2019.
(Continued)

*Primary Examiner* — Michael P Ferguson
(74) *Attorney, Agent, or Firm* — The Roy Gross Law Firm, LLC; Roy D. Gross

(57) ABSTRACT

A modular fence assembly, including multiple fence modules each comprising: a barrier comprising a pair of substantially parallel end posts, and a base configured to stabilize the respective fence module on a surface. The modular fence assembly further includes multiple connectors each configured to connect two adjacent fence modules of the multiple fence modules, wherein: each of the multiple connectors is configured as a double hinge having a pair of parallel internal channels, and each of the internal channels is configured to embrace an end post of one of the two adjacent fence modules. The multiple fence modules and the multiple connectors are configured to be assembled into a fence.

13 Claims, 18 Drawing Sheets

(56) References Cited

U.S. PATENT DOCUMENTS

| | | | |
|---|---|---|---|
| 6,257,559 B1 | 7/2001 | Mouri | |
| 6,305,672 B1 | 10/2001 | Case | |
| 6,505,994 B1 * | 1/2003 | Attar | E01F 9/619 |
| | | | 404/9 |
| 7,234,275 B1 * | 6/2007 | Haggy | E01F 15/088 |
| | | | 256/26 |
| 9,119,381 B2 * | 9/2015 | Gingerich | A01K 1/0005 |
| 9,675,052 B2 | 6/2017 | Gingerich | |
| 2008/0038048 A1 | 2/2008 | Pingel et al. | |
| 2014/0230742 A1 | 8/2014 | Gingerich | |
| 2017/0363124 A1 * | 12/2017 | Brown | F16B 7/0433 |
| 2019/0093296 A1 | 3/2019 | Whiteley | |
| 2021/0238817 A1 | 8/2021 | Mereu | |

FOREIGN PATENT DOCUMENTS

| | | | | | |
|---|---|---|---|---|---|
| GB | 1132732 A | 11/1968 | | | |
| GB | 1388502 A | 3/1975 | | | |
| GB | 2391560 A | 2/2004 | | | |
| GB | 2 413 141 | * | 10/2005 | ............ | E01F 13/022 |
| GB | 2 462 354 | * | 10/2012 | ............ | E01F 13/022 |
| GB | 2504118 A | | 1/2014 | | |
| GB | 2 518 895 | * | 4/2015 | ............ | E01F 13/022 |
| GB | 2 555 807 | * | 5/2018 | ............ | E01F 13/022 |
| GB | 2 564 168 | * | 6/2019 | ............ | E01F 15/08 |
| JP | 2000054331 A | | 2/2000 | | |
| MX | 28912 B | | 7/2009 | | |
| TW | 201905302 A | | 2/2019 | | |
| WO | 2019234780 A1 | | 12/2019 | | |

OTHER PUBLICATIONS

PCT International Search Report for International Application No. PCT/IL2021/050981, mailed Nov. 9, 2021, 4pp.

PCT Written Opinion for International Application No. PCT/IL2021/050981, mailed Nov. 9, 2021, 6pp.

Sephnos S.A de C.V., product brochure entitled "EVOLUTION Barrera Anti-Migratoria", Mexico, estimated publication date Jun. 2019 or earlier.

* cited by examiner

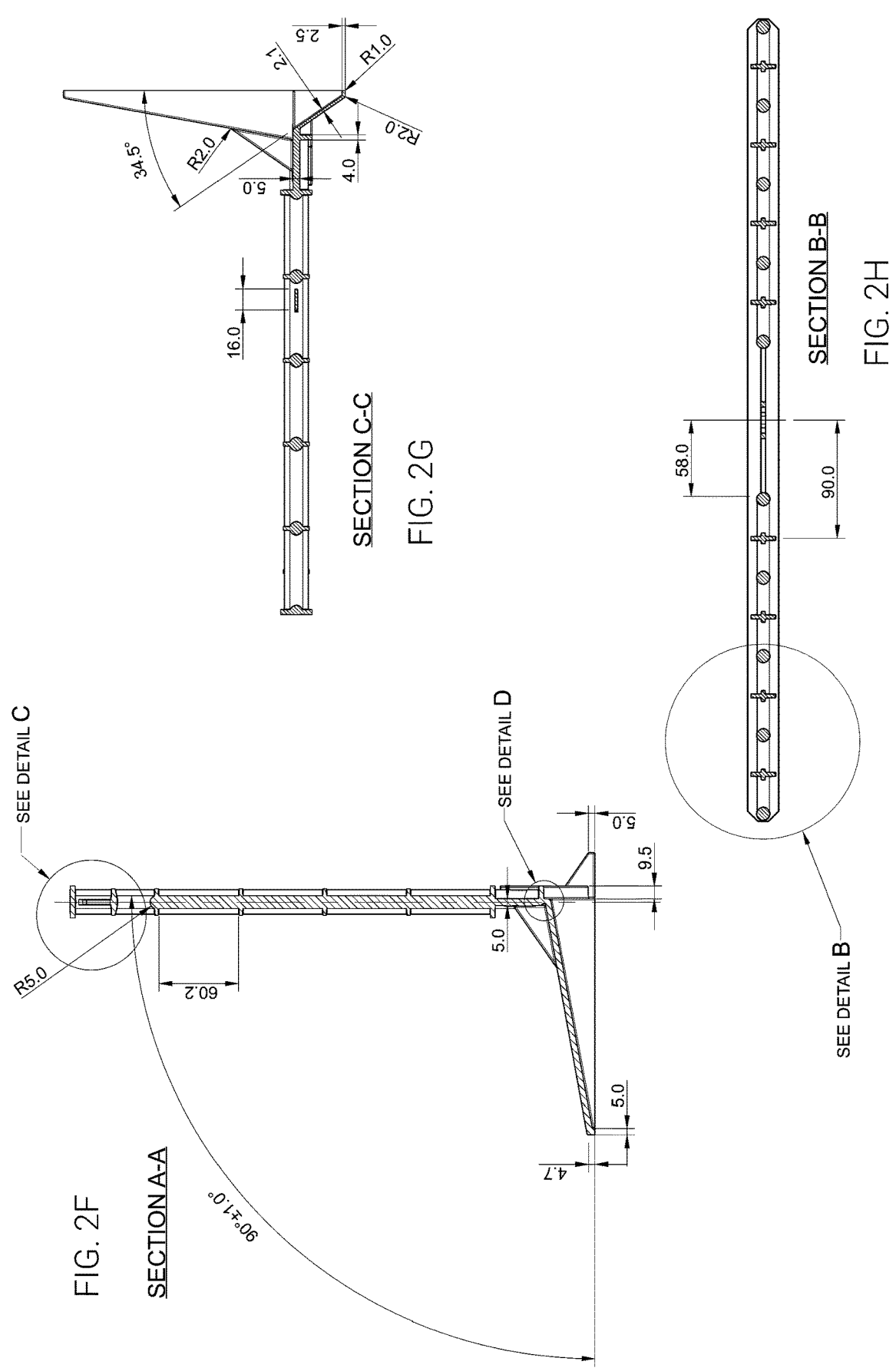

DETAIL A

DETAIL D

DETAIL C

DETAIL B

SECTION A-A

DETAIL B

DETAIL A

SECTION A-A

MODULAR FENCE ASSEMBLY

CROSS-REFERENCE TO RELATED APPLICATIONS

This application is a National Phase of PCT Patent Application No. PCT/IL2021/050981 having International filing date of Aug. 11, 2021, which claims priority to U.S. Provisional Patent Application No. 63/064,058, filed Aug. 11, 2020, and entitled "Modular Fence Assembly," the contents of which are all incorporated herein by reference in their entirety.

BACKGROUND

The invention relates to the field of fences.

Fences come in a variety of types, styles and structures. Outdoor fences are typically secured to the ground using posts inserted underground, or by affixing them to an existing artificial structure such as concrete or asphalt. Indoor fences are often mobile and able to support themselves without permanent fixation to the floor or walls.

Mobile fences are naturally more prone to toppling when pushed, making them unsuitable in many scenarios where animals or humans are expected to regularly push the fence, intentionally or unintentionally.

Many mobile fences are cumbersome, and are less than convenient to install, uninstall, and mobilize.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a modular fence assembly, comprising: Multiple fence modules each comprising: a barrier comprising a pair of substantially parallel end posts, and a base configured to stabilize the respective fence module on a surface. Multiple connectors each configured to connect two adjacent fence modules of said multiple fence modules, wherein: each of said multiple connectors is configured as a double hinge having a pair of parallel internal channels, and each of said internal channels is configured to embrace an end post of one of the two adjacent fence modules.

Said multiple fence modules and said multiple connectors are configured to be assembled into a fence.

In some embodiments, each of said internal channels of said connector is a tubular channel; and each of said end posts of said barrier has a circular profile configured to pivot inside said tubular channel.

In some embodiments, said barrier comprises a lattice having multiple pickets that are disposed substantially parallel to said end posts; and each of said internal channels of said connector is further configured to embrace a picket of said barrier.

In some embodiments, said base and said barrier are integrally formed.

In some embodiments, said base comprises a substantially planar structure disposed substantially orthogonally to said barrier and extending from at least a first side of said barrier, to a length from said first side of said barrier equal to between 25% and 100% of a height of said barrier.

In some embodiments, said substantially planar structure extends to a length from the first side of said barrier equal to between 35% and 50% of the height of said barrier.

In some embodiments, said substantially planar structure comprises a moderately-sloped platform extending downwardly from the first side of said barrier, wherein said moderately-sloped platform comprises one or more lower edges configured to engage the surface on which said fence module is positioned; and said bases of said multiple fence modules are configured to at least partially fit underneath one another when said multiple fence modules are stacked.

In some embodiments, said multiple fence modules and said multiple connectors are configured to be assembled into a fence by serially connecting said multiple fence modules using said multiple connectors, wherein, in the series, said multiple fence modules alternate between having the base extending to one side of the fence and having the base extending to an opposite side of the fence.

In some embodiments, said multiple fence modules and said multiple connectors are configured to be assembled into a fence by serially connecting said multiple fence modules using said multiple connectors, wherein, in the series, said multiple fence modules have their bases extending to a same side of the fence.

In some embodiments, each of said fence modules further comprises a pair of legs extending from an opposite side of said barrier, peripherally of where said base extends from said barrier.

Another embodiment is directed to a use of the modular fence assembly as a poultry migration fence.

A further embodiment relates to a method for using the modular fence assembly as a poultry migration fence, the method comprising: assembling the modular fence assembly into a fence inside a poultry house, while allowing food pipes and/or water pipes of the poultry house to pass between adjacent fence modules of the fence.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 1A-1C show a front isometric view, a top isometric view, and an oblique isometric view, respectively, of an exemplary modular fence assembly that is assembled into a fence, in accordance with some embodiments.

FIGS. 2A-2L show a front perspective view, a front isometric view, a rear isometric view, a side isometric view, a top isometric view, three different cross-sectional views, and four different enlarged views, respectively, of an exemplary fence module, respectively.

DETAILED DESCRIPTION

Figures 1A, 1B:
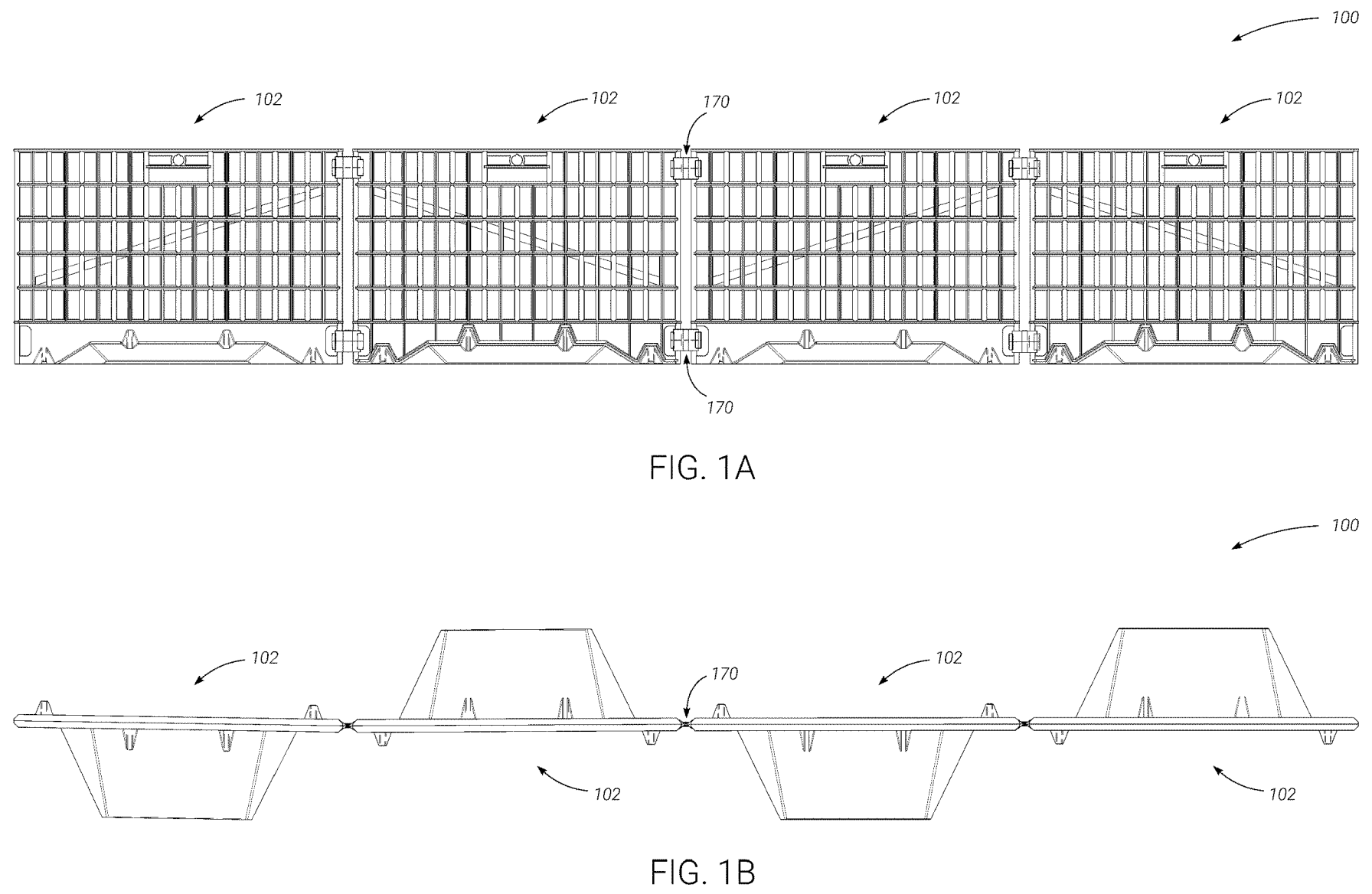
Figure 1C:
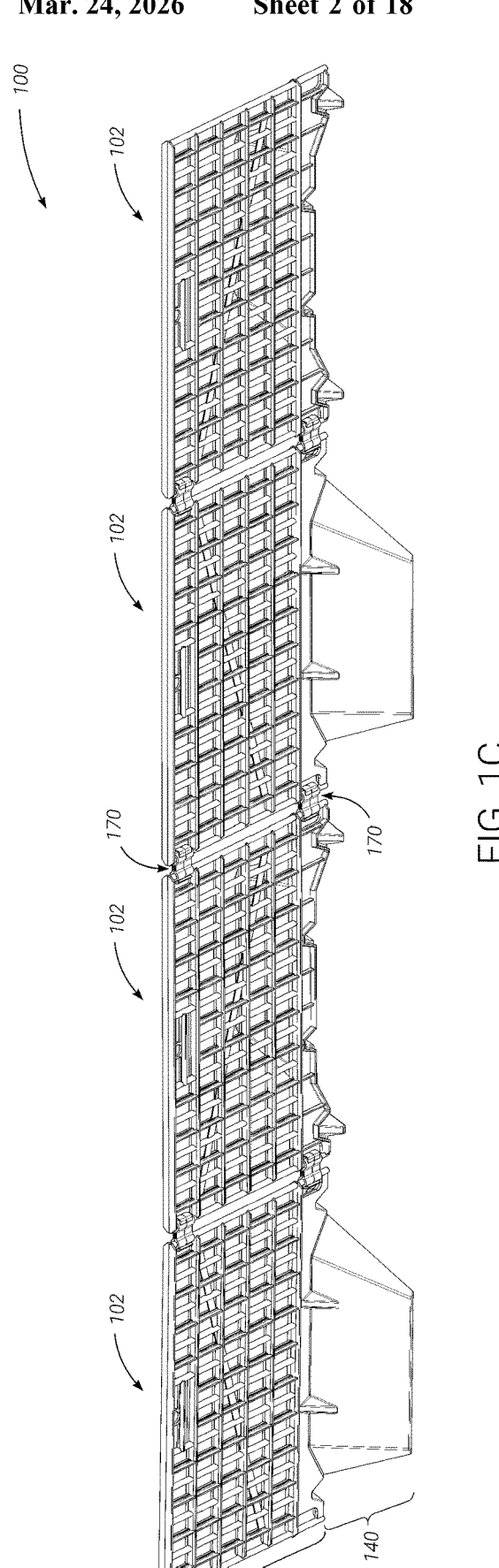

A modular fence assembly is disclosed herein. With general reference to FIGS. 1A-1C, the modular fence assembly may include multiple fence modules 102, each having a barrier 104 and a base 140, connected in series to form a fence 100. Every pair of adjacent fence modules 102 may be connected using one or more connectors 170. A fence may be assembled from a suitable number of fence modules, selected according to a desired length of the fence.

The modular fence assembly may be configured to enable angular motion between every two adjacent fence modules, such that a fence may be assembled and installed on a surface (e.g., on the ground, on a floor) in various user-selected configurations. For example, the fence may be configured in a straight line, a curve, a zigzag pattern, a closed loop of various shapes, and any other configuration which may be formed by manipulating the angle between adjacent fence modules. As another example, the fence may be configured in a branched formation, in which a fence segment comprised of multiple serially-connected fence modules is branched off the middle of another fence segment (not necessarily off its absolute center, but rather off one of its non-extreme fence modules), to form fence configurations which are generally T-shaped, E-shaped, Y-shaped, X-shaped, or the like.

Figures 7A, 7B:
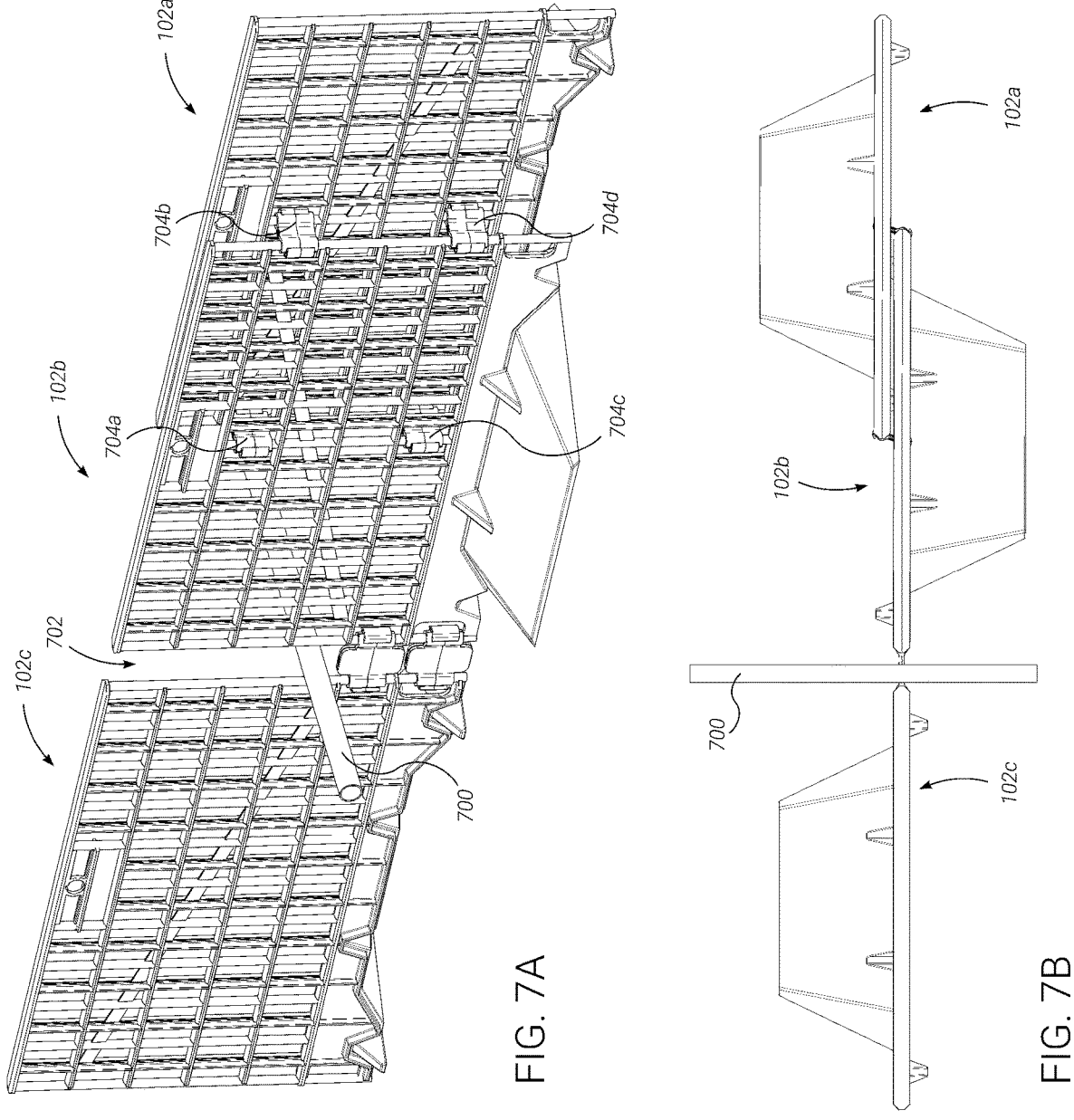
FIGS. 7A-7B show a front perspective view and a top isometric view, respectively, of an exemplary assembled fence with two partially-overlapping fence modules, in accordance with some embodiments.

The modular fence assembly may also be configured to enable an overlapping connection of two adjacent fence modules, in order to shorten the length of a certain fence segment. As generally shown in FIGS. 7A-7B, fence modules 102a and 102b may be connected in a partially-overlapping fashion, not by their ends but rather by their more internal pickets. This may be useful when the fence must be configured around some constraint, such as a pipe 700 that has to cross it at a certain location.

The connectors may each be configured as a double hinge. With general reference to FIGS. 3A-3B, a connector 170 may include a pair of parallel internal channels 172 and 174. Each channel may be configured to embrace an end post of a fence module, and to enable pivotal motion of the end post within the channel.

Differently-sized connectors may be provided with the assembly, to address differing needs relating to horizontal spacing between adjacent fence modules. For example, a relatively wide connector 500, shown in FIGS. 5A-5C and 6, may be used to space these fence modules apart so that an object, such as a pipe 600 or another utility line, may cross the fence in that space. A relatively narrow connector, such as the one in FIGS. 3A-3B, may be used to form a denser fence segment, for example to block an animal from passing through the fence in between fence modules.

Figure 6:
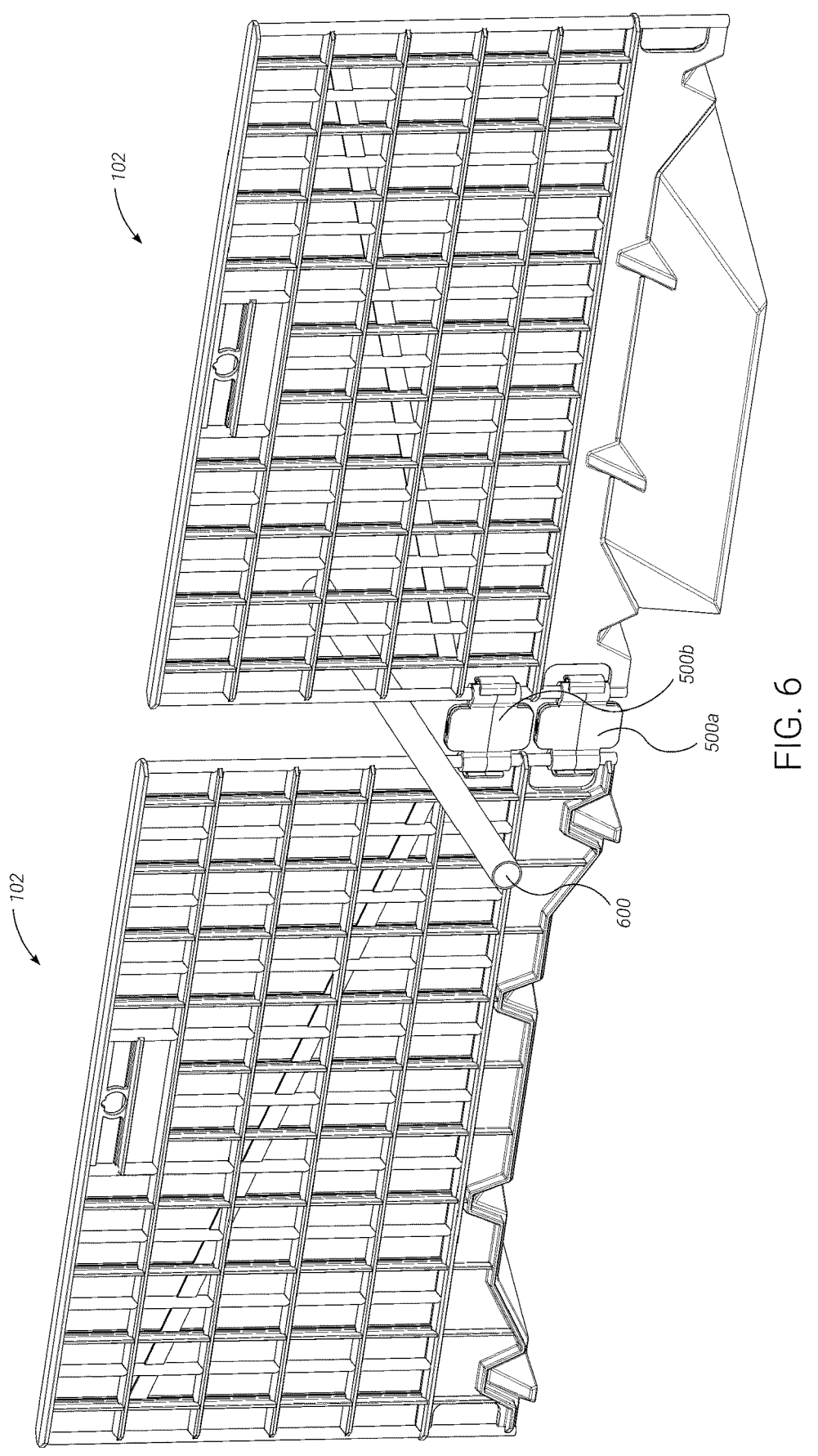
FIG. 6 shows a front perspective view of a pipe crossing an exemplary assembled fence, in accordance with some embodiments.

As another example, generally shown in FIG. 6, two or more connectors 500a and 500b may be assembled at different heights between a pair of adjacent fence modules, so that animal passage is physically blocked by the connectors themselves. This may be useful, for instance, to physically block any relatively wide space formed between adjacent fence modules where pipe 600 or another utility line crosses.

Figures 8A, 8B:
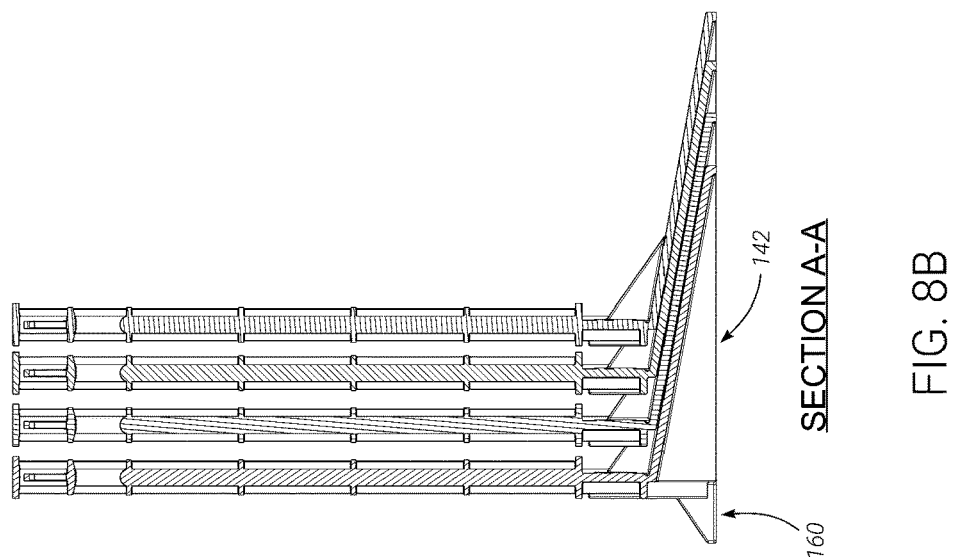
FIGS. 8A-8B show a front perspective view and a cross-sectional view, respectively, of stacked fence modules, in accordance with some embodiments.

For efficient shipping and storage, the fence modules may be configured to be tightly stacked. For example, as generally shown in FIGS. 8A-8B, the bases of the fence modules may be configured to at least partially fit underneath one another, so that the fence modules can be tightly stacked with their barriers parallel to each other.

Figure 9:
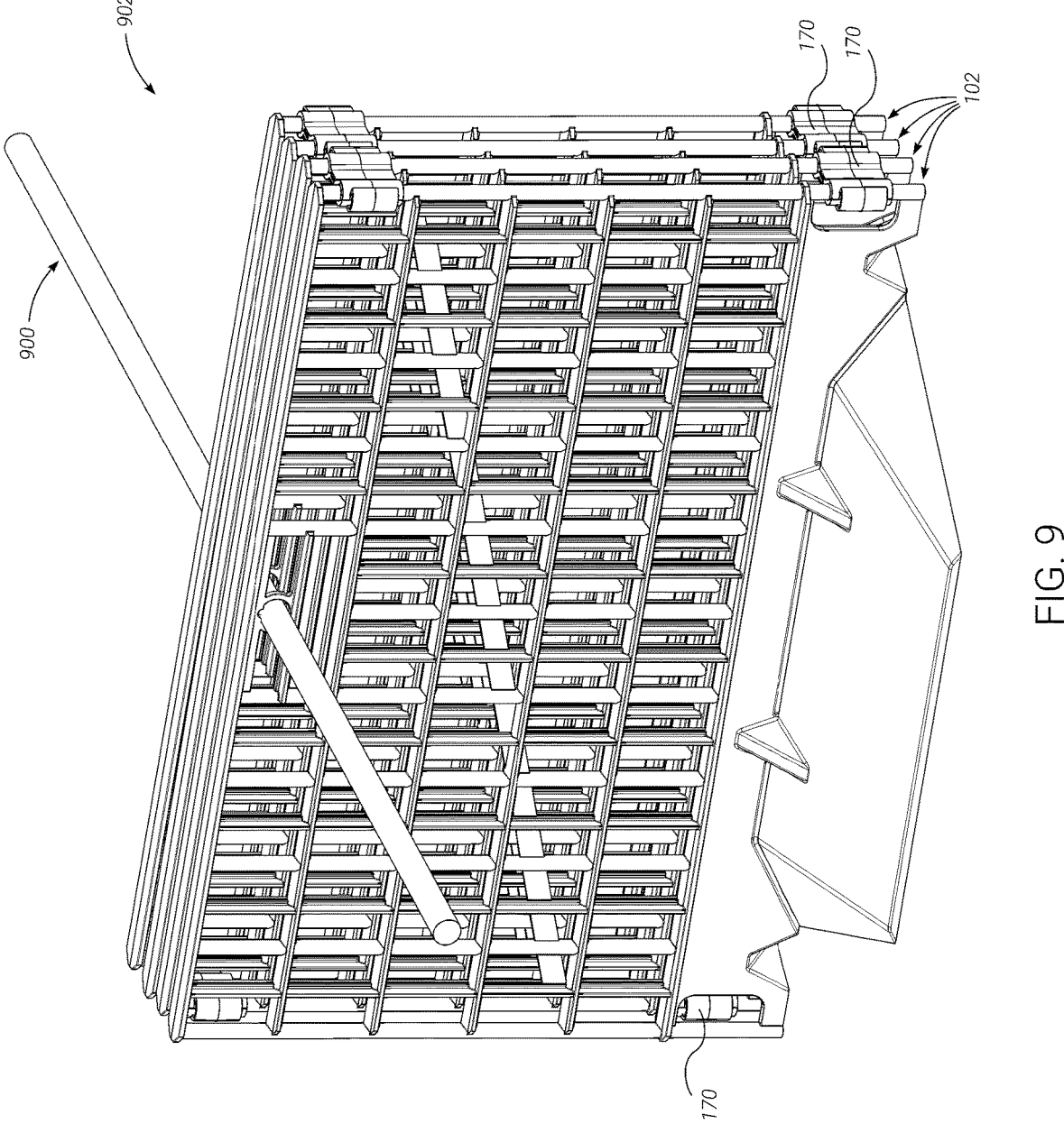
FIG. 9 shows a front perspective view of an exemplary folded fence carried by a rod, in accordance with some embodiments.

For temporary storage of an assembled fence, as well as for its convenient mobilization, the fence may be folded in a zigzag pattern until all fence modules become parallel, with their bases at least partially (and optionally, fully) fitted underneath one another, as generally shown in FIG. 9. Then, to mobilize the folded fence, it may be lifted and carried by a pole 900 inserted through the barriers of all fence modules. To facilitate that configuration, the connectors may each be dimensioned and configured correspondingly to the minimal possible distance (optionally, plus some tolerance) between two snugly stacked fence modules; this will ensure that, upon folding the assembled fence in a zigzag pattern with the fence modules parallel, there is only negligible wasted space between adjacent fence modules.

The modular fence assembly may have various different uses. For example, it may be used to assemble a fence that prevents movement of animals and/or humans (children or adults) between two areas, or to enclose a certain area in which animals and/or humans are located, or to which they are not permitted to enter. The assembled fence may be used to define a closed play yard for children, whether indoors or outdoors. Similarly, the assembled fence may be used to confine a pet to a defined area, such as to provide a confined training area for puppies.

Advantageously, the modular fence assembly is configured to withstand pushing by the animals and/or humans without toppling over. The base of each fence module may include a substantially planar structure that is substantially orthogonal to the barrier, and therefore lies flush (or almost flush) with the floor or the ground. That substantially planar structure is configured to allow an animal or a human to stand, sit, or crawl on. If the animal or human push or lean against the barrier of the fence module while dwelling on that substantially planar structure of the base, their body weight may counteract the pushing force and not allow the fence module to topple over. Similarly, if one animal pushes or leans against the barrier while another animal dwells on the base of the same fence module, there is little chance of the fence module toppling over.

This is most effective when a horizontal distance from the center of gravity of the pusher to the bottom of the barrier is greater than a vertical distance from the bottom of the barrier to the location of the barrier where the pushing force is concentrated or centered. Accordingly, the fence module may best withstand pushing by animals whose typical height is similar to their typical length (e.g., within 50% of each other) or by crawling babies. This may be translated to a rule of thumb of configuring the substantially planar structure to have a horizontal length (measured from the side of the barrier from which the substantially planar structure extends) equal to between 25% and 100% of the height of the barrier, or more narrowly between 30-55% of the height of the barrier. Additional options are 25-35%, 35-45%, 45-55%, 55-65%, 65-75%, 75-85%, 95-100%, or any broader range encompassing two or more of these smaller ranges.

Additionally, when the fence is assembled in a closed shape (such as a circle), that closed shape itself may prevent the fence from toppling over, regardless of whether the animals or humans push it while dwelling on the base's substantially planar structure or not. This effect is naturally stronger the smaller the closed shape is.

When the fence is assembled in an open shape, such as in a substantially straight line, a curve, a zigzag pattern, or any combination thereof, the fence modules may be assembled with their substantially planar structure alternately directed to opposite sides of the fence (or the fence may alternate direction only every few fence modules). In this configuration, pushing from one side of the fence will encounter resistance from the substantially planar structures on the other side of the fence, and toppling will be prevented.

One particularly advantageous use of the modular fence assembly is as a poultry migration fence. Poultry migration fences are often used in large poultry houses (sometimes referred to as "poultry farms" or "coops") to distribute the poultry population more uniformly over the poultry house's floor area. This prevents the birds from over-crowding certain areas, and improves access to food and water by all birds. Use of poultry migration fences is more prevalent in the growing of broilers, since the young poultry gain weight rapidly and cannot usually fly even over a low (e.g., 35-55 cm) fence.

The present modular fence assembly, which on one hand is convenient to transport to the poultry house, assemble, deploy on the poultry house's floor, clean, fold, and mobilize around the poultry house, and on the other hand provides much-needed stability, may be very beneficial as a poultry migration fence.

Reference is now made to the Figures in greater detail.

Measurements shown in any of the Figures denote optional embodiments of the invention, and should be understood according to one of the following options, or according to any combination of these options:

In one option, elements may have the length, diameter (denoted by the sign Ø followed by a number), and/or radius (denoted by the letter R followed by a number) indicated for them, in a unit of millimeters, multiplied by a factor of between 0.1 and 10, such as between 0.1-1, 1-2, 2-3, 3-4, 4-5, 5-6, 6-7, 7-8, 8-9, 9-10, or or any broader range encompassing two or more of these smaller ranges. For example, an element with an indicated length of "10" may be between 1 mm and 100 mm long. The same or a different multiplication factor may be used for different elements, except that, for elements whose measurements are clearly co-dependent, the same multiplication factor may be used.

In another option, indicated lengths, diameters, and/or radii for two or more elements may denote a ratio of such measurement between these elements, or a ±20% range of ratios. For example, if one element has an indicated diameter of "10" and the other has an indicated diameter of "15," this may denote a ratio of 1:1.5 between the diameters of these elements, or a range between 1:1.2 (−20%) and 1:1.8 (+20%) of the diameters of these elements.

In a further option, elements may be shaped and/or positioned in accordance with the indicated angles (in degrees), or within a range of ±30° of those angles.

In any of these options, an indicated numerical value may also denote a permitted manufacturing tolerance, as known in the art, indicated either with a "±" sign for positive or negative tolerance, with a subscript for a negative tolerance, or with a superscript for a positive tolerance.

These options only describe optional embodiments of the invention, and other embodiments may include one or more elements measuring differently than what these options encompass.

In the Figures, a numerical value followed by a multiplication sign, another numerical value, and the abbreviation "TYP.", means that the measurement is indicated for one typical element, but applies to the identical elements adjacent to it. For example, if "10×5TYP." is indicated for a certain rod, it means that each of the five identical rods measures "10."

Reference is made to FIGS. 2A-2E, which show an exemplary fence module (or simply "module") 102 in a front perspective view, a front isometric view, a rear isometric view, a side isometric view, and a top isometric view, respectively. Reference is also made to FIGS. 2F-2H which show different cross-sections of module 102, and to FIGS. 2I-2L which show different enlarged areas of the module.

Module 102 may include a barrier 104 configured to erect orthogonally or substantially orthogonally relative to a surface on which assembled fence is installed, and a base 140 configured to stabilize the module on that surface (referred to hereinafter, for simplicity, as the "floor").

Module 102 may be integrally formed, for example in an injection molding manufacturing process. Module 102 may be made of a stiff plastic, such as Polypropylene (PP), High-Density Polyethylene (HDPE), or the like. Optionally, one or more antibacterial agents may be added to that plastic during manufacturing, to increase resistance of module 102 to superficial bacterial growth. In a different configuration, a module may be made of metal. Advantageously, when module 102 is manufactured from PP or HDPE, at a size of approximately 40 cm (barrier height) by approximately 21 cm (base length), its weight may only be around 1.1 to 1.4 kilograms, making it easy to move and assemble. In other configurations (not shown), a module may have a lower or higher weight for the same measurements, or a different ratio of size to weight.

As an alternative to integrally forming module 102, different parts thereof may be manufactured separately and attached or assembled together either at the factory or by the user who installs the fence.

Barrier 104 may be configured to block passage of animals, humans, and/or other moving objects from one side of the module to another. Barrier 104 may have a generally rectangular shape, for instance. For example, barrier 104 may include a lattice with openings smaller than the objects whose blockage is required. The lattice may include multiple vertical rods (referred to herein as "pickets") 106 and multiple horizontal rods (referred to herein as "rails") 108. In the example shown, the lattice is formed by 21 pickets and 5 rails, but other configurations (not shown) may include between 3-100 pickets and 2-100 rails, or even higher numbers. The two most extreme pickets are referred to herein as the end posts 106a of module 102.

Optionally, the lattice includes at least one diagonal rod 110 for reinforcement, which further interconnects multiple ones of the pickets 106 and rails 108. Diagonal rod 110 may increase the rigidity of barrier 104 to bending along its vertical and horizontal axes.

It should be noted that if module 102, or at least barrier 104, is integrally formed by injection molding, pickets 106 and rails 108 are not in fact unitary elements, but rather structural elements which are embedded together at the locations where they cross each other.

Optionally, the lattice extends to a majority of the height of barrier 104, and is replaced by a different structure at the bottom of the barrier. That different structure may be configured to more intimately interface with base 104. For example, a bottom portion of barrier 104 may include a solid plate 112. Plate 112 may include generally rectangular openings 112a at its lateral ends, exposing the two end posts 106a, to allow a mounting of connector 170 on any of the end posts, at the same horizontal level as the plate.

In other configurations (not shown), a barrier may include a different internal structure to block passage and to provide structural stability, such as a different arrangement of rods, a solid plate, a perforated plate, a mesh, or any combination thereof.

Figure 2A:
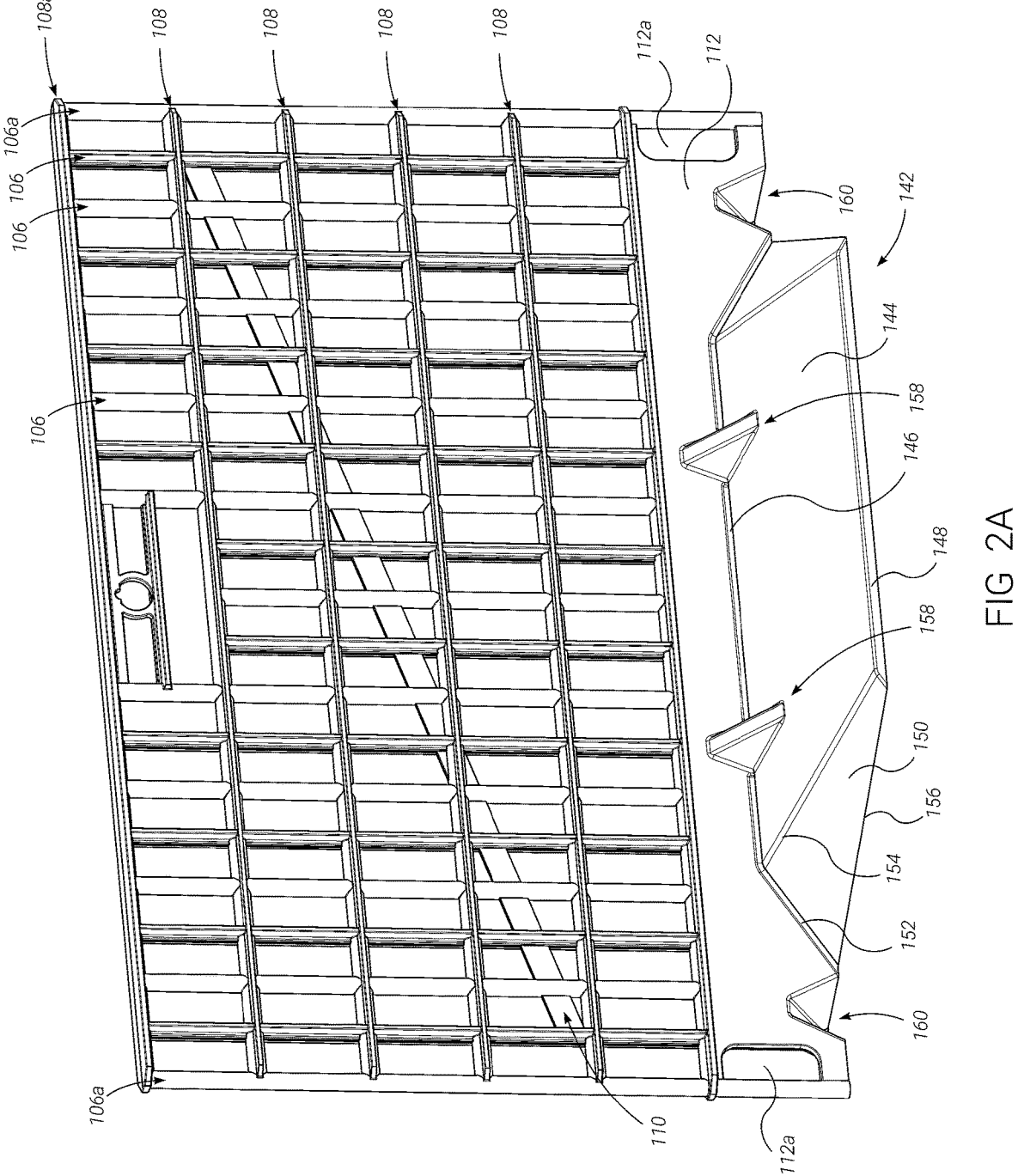
Figure 2B:
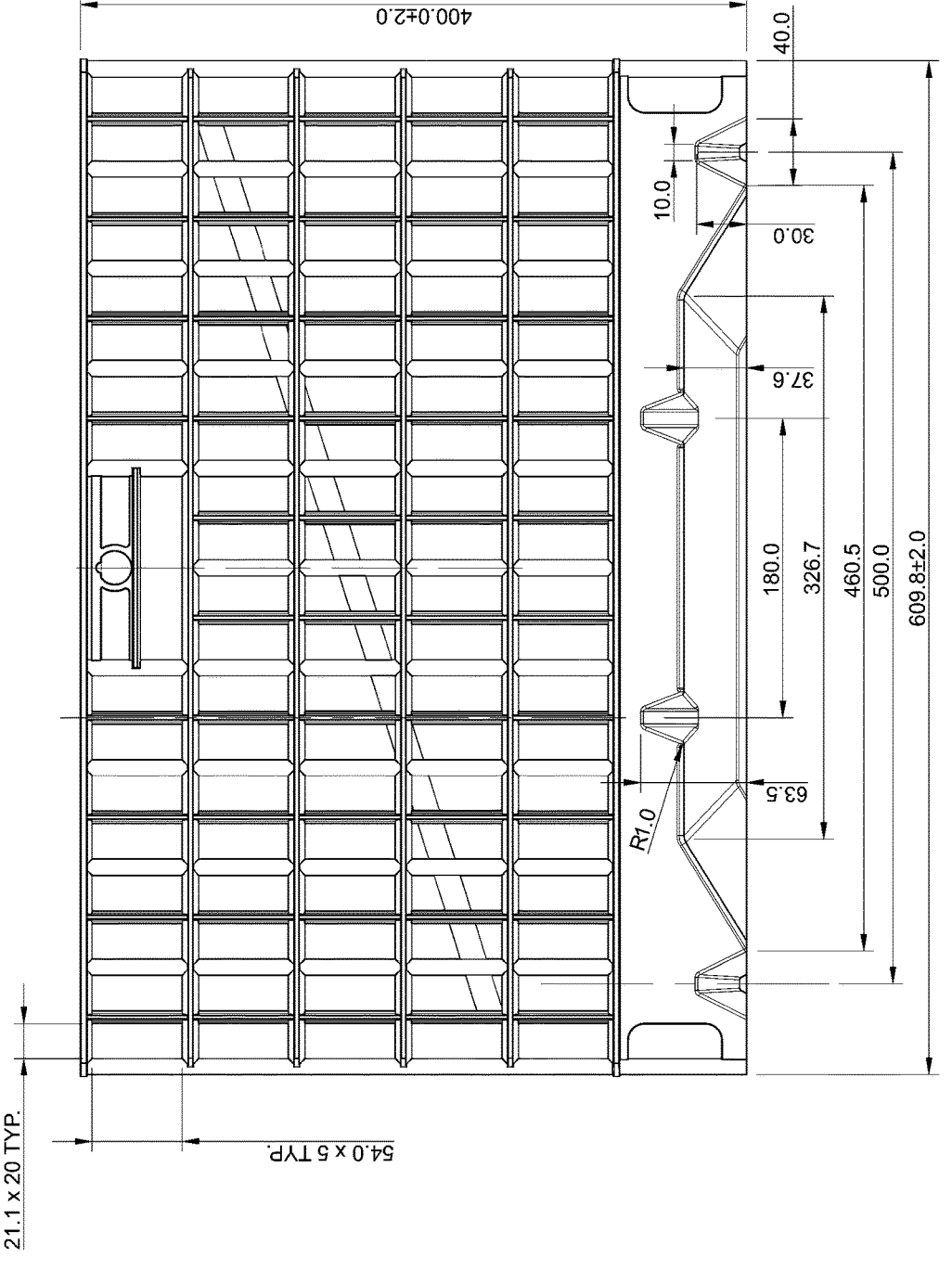
Figure 2C:
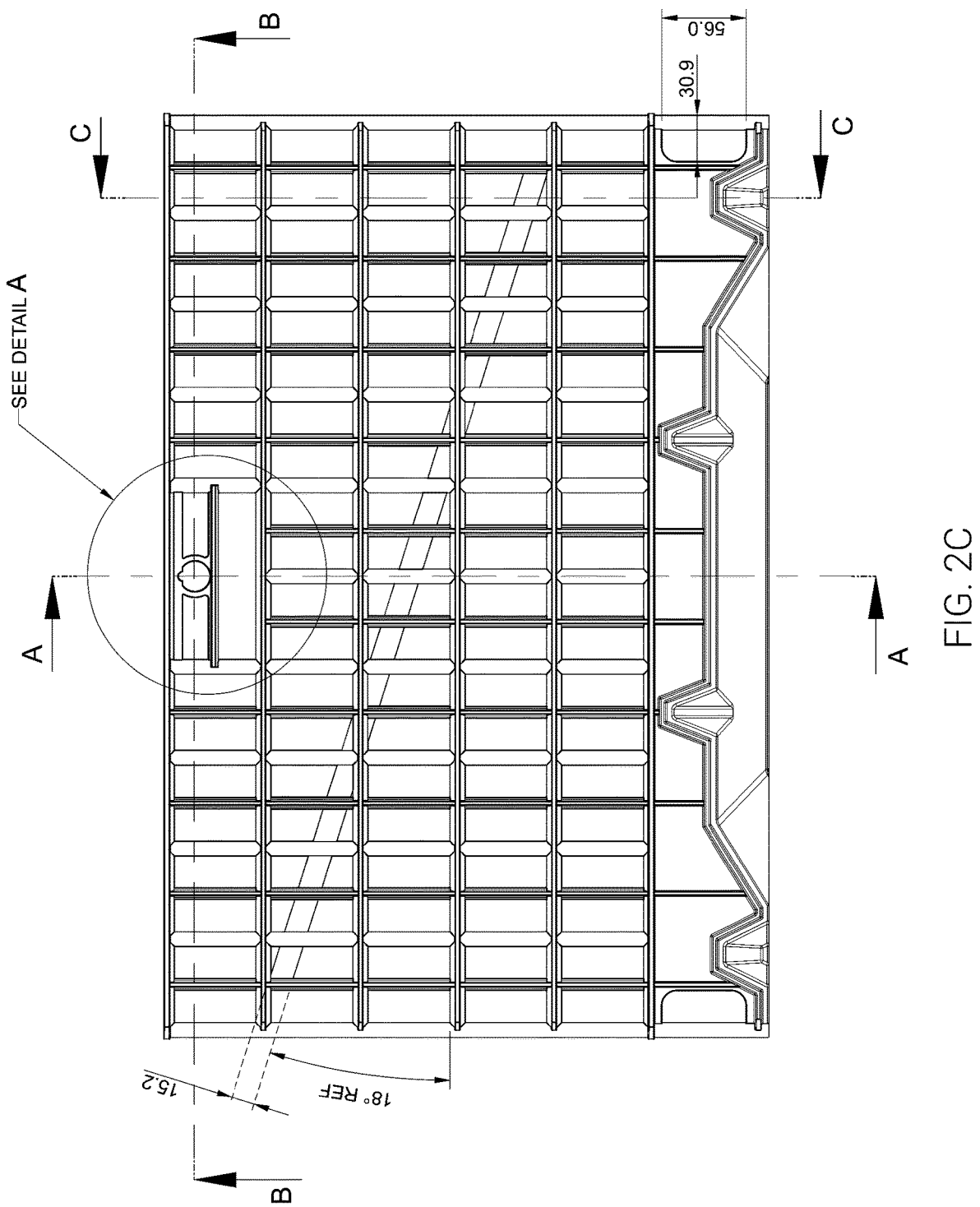
Figure 2E:
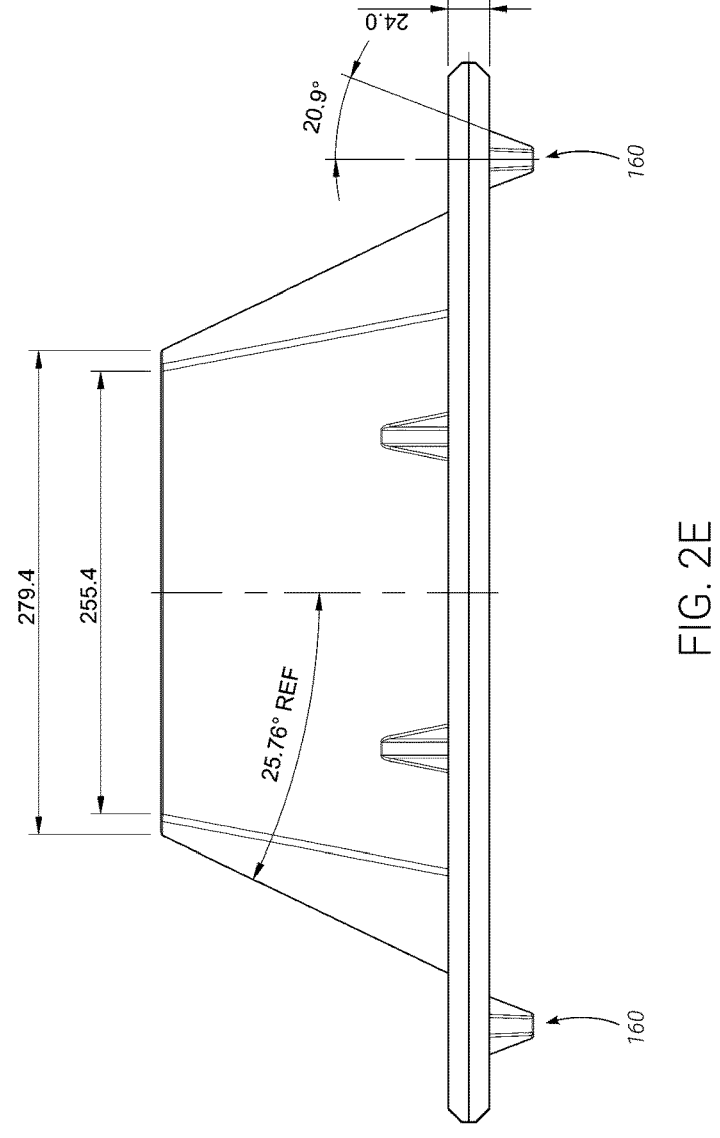
Figure 2D:
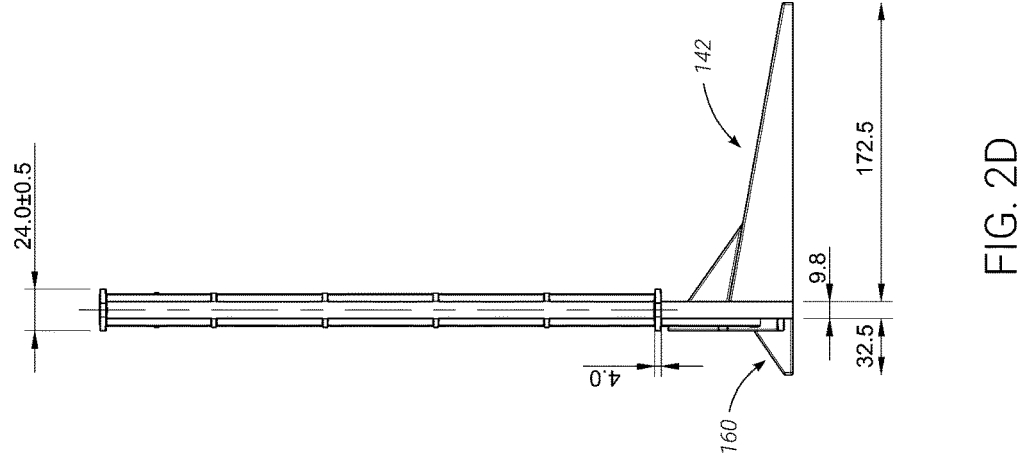
Figure 2I:
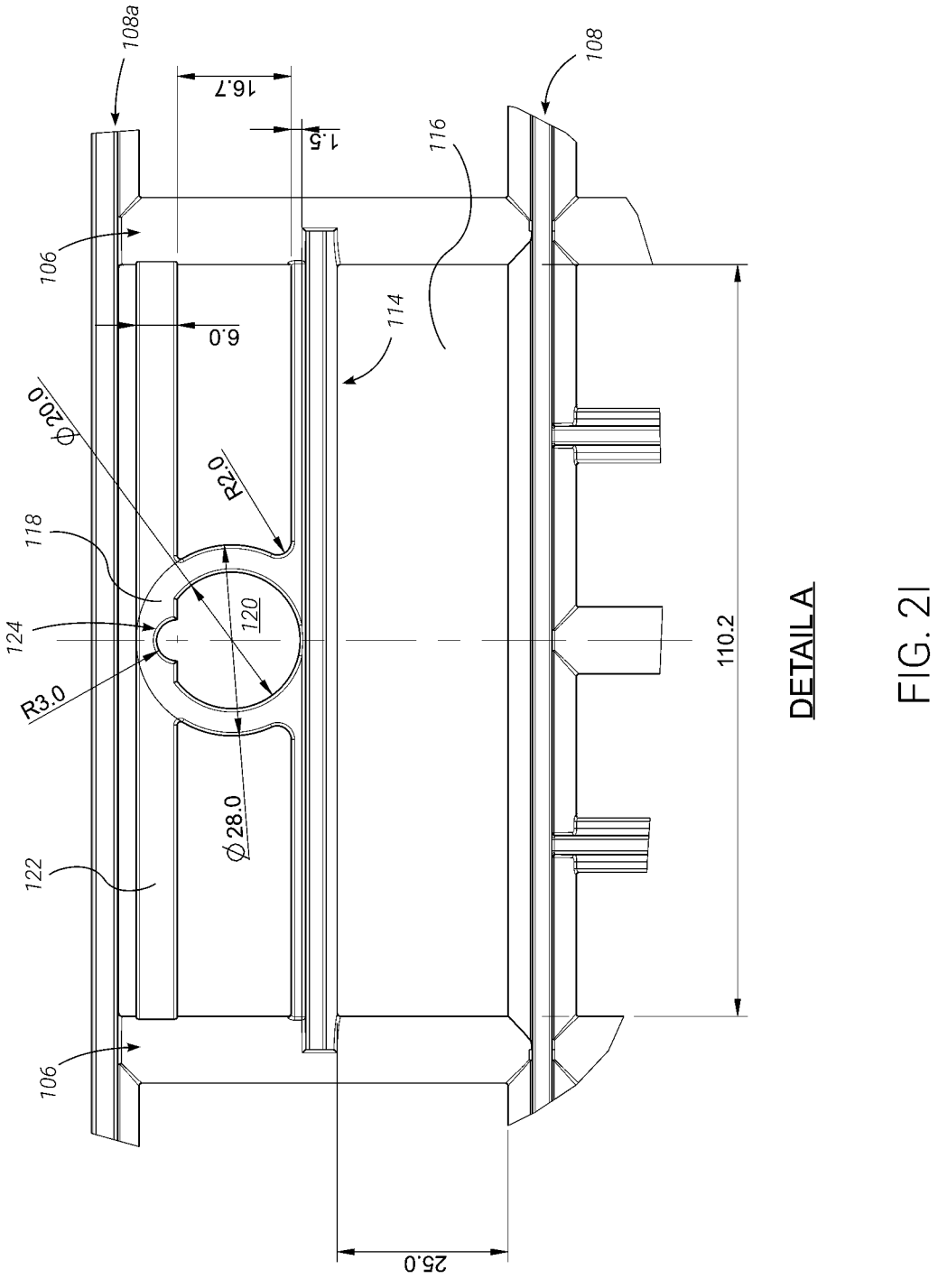
Figures 2J, 2K, 2L:
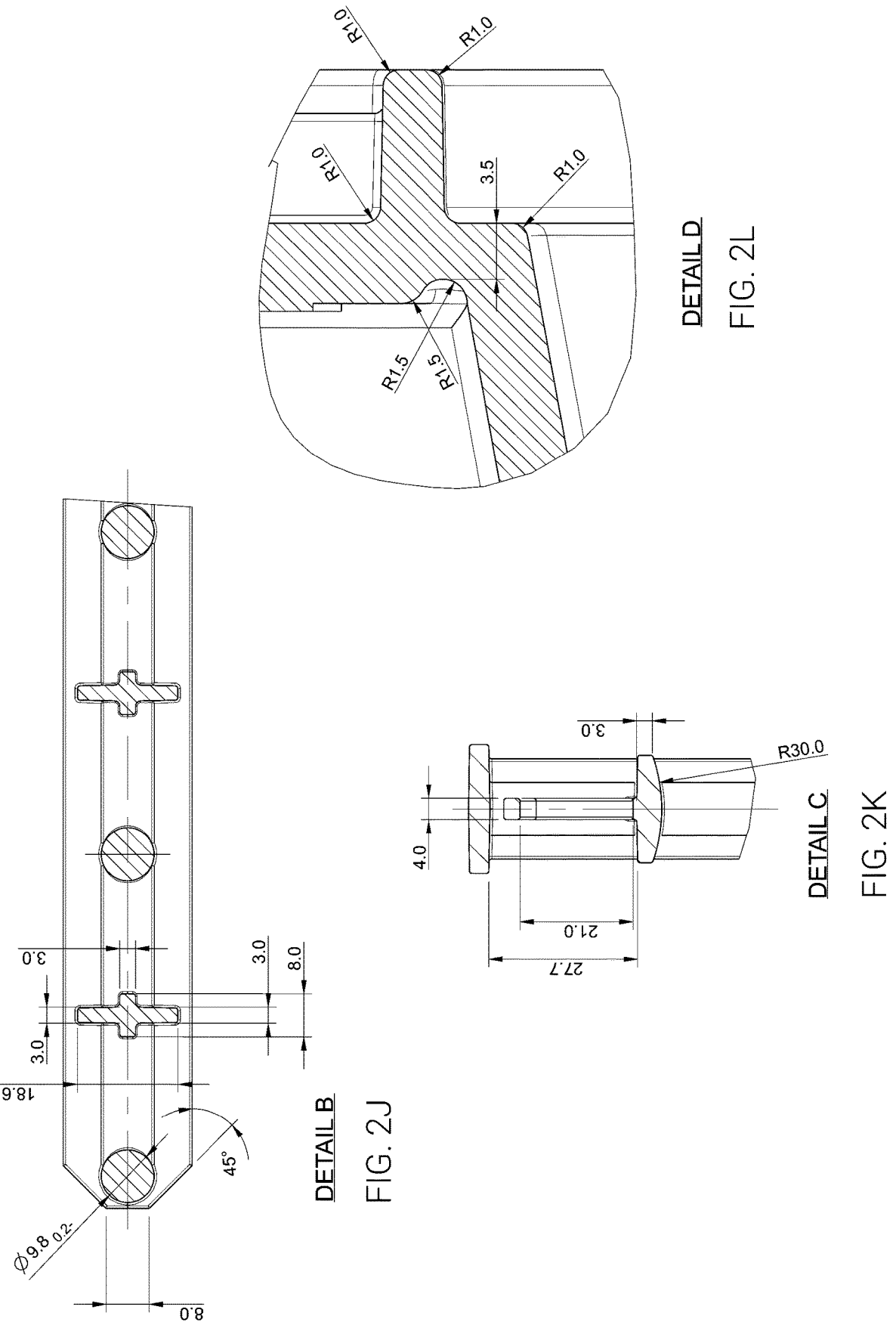

Specific reference is now made to FIG. 21, which shows an enlarged view of the region marked with "see detail A" in FIG. 2C. This region extends vertically between top rail 108a and rail 108 beneath it, and horizontally at the center of barrier 104, for example between the second pickets 106 on both sides of the center. This region may be vertically separated by another horizontal rod 114. No pickets may extend from lower in barrier 104 into the space 116 between rod 114 and the rail 108 second from the top, so that rod 144 is configured to serve as a carrying handle for module 102, positioned over the center of gravity of the module. Space 116 may be large enough for a hand of an adult.

Between rod 114 and top rail 108a, a still above the center of gravity of module 102, a ring 118 may be disposed. A central opening 120 of ring 118 may be used for insertion of a carrying pole, as discussed further below. Optionally, an additional rail 122 may be disposed vertically below top rail 108a, and partially embedded with ring 118, in order to further reinforce ring 118 to the lattice and prevent its breakage when module 102 is carried by the ring.

Optionally, at the center and top of central opening 120 of ring 118 there is a small notch 124, configured to connect to a lift cable. If the assembled fence is installed in a poultry house, at least some of modules 102 may be connected to lift cables that extend vertically towards the ceiling of the poultry house, where they may be connected to a lifting system, optionally motorized, configured to lift the fence as well as food and/or water pipes. These may be lifted, for example, in order to clean the floor of the poultry house between growing cycles.

Next discussed is base 140. Base 140 may be disposed at the bottom of module 102, and extend to one or both sides of the module. For example, on one side of module 102 (in the shown example, the front side), base 140 may include a substantially planar structure that is substantially orthogonal to barrier 104, shown here as a moderately-sloped platform 142 extending downwardly from the front side of barrier 104, such as from the barrier's solid plate 112.

Moderately-sloped platform 142 may include, for example, three slopes: a generally trapezoid central slope 144 whose upper edge 146 is aligned horizontally with module 102 and whose lower edge 148 is parallel to and shorter than the upper edge; and two generally triangular lateral slopes 150 each having: a rear edge 152 extending laterally from an upper corner of central slope 144 towards the respective lateral end of module 102, an upper edge 154 extending from the upper corner of the central slope towards a lower corner of the central slope, and a lower edge 156 extending over the same horizontal plane as the lower edge of the central slope. Lower edge 148 of central slope 144 and lower edges 156 of lateral slopes 150 together form a lower edge of moderately-sloped platform 142, configured to engage the floor and stabilize module 102. Moderately-sloped platform 142 optionally lacks a bottom cover and is open towards the floor.

Although the lower edge of moderately-sloped platform 142 is shown as a straight edge configured to contact the floor along its entire length, a different configuration (not shown) may have that lower edge include some regions configured to contact the floor and one or more regions configured to be elevated from the floor.

Moderately-sloped platform 142 may be further reinforced to barrier 104 by one or more struts. For example, two struts 158 may be disposed over upper edge 146 of central slope 144, further supporting the central slope and plate 112 of barrier 104. Each strut 158 may be shaped as a hollow wedge which opens to the rear side of barrier 104 and to the inner volume of moderately-sloped platform 142.

When the fence assembly is to be used as a poultry migration fence, some or all of the measurements indicated in the figures may be in centimeters, multiplied by a factor of 0.9 to 1.1, or more narrowly by a factor of 0.95 to 1.05. Specifically, the substantially planar structure of the base, such as moderately-sloped platform 142, may extend to a horizontal length (measured from the side of the barrier from which the moderately-sloped platform extends) of 14-20 cm, and the height of barrier 104 may be between 35-45 cm, respectively. This translates to a ratio in the range of 1:2.5 to 1:2.65 between the horizontal length of the substantially planar structure of the base and the height of barrier 104. A fence assembly having such measurements was successfully tested in a poultry house populated by broilers that reach a maximum average weight of about 2.5-3 kilograms over a grow cycle of 40-50 weeks.

In other configurations, the measurements of the substantially planar structure of the base and the barrier may be different than these, for example to accommodate different breeds of poultry, different growing styles, etc. For example, some or all of the measurements indicated in the figures may be in centimeters, multiplied by a factor of 0.7 to 1.5, or more narrowly between 0.7-0.8, 0.8-0.9, 0.9-1, 1-1.1, 1.1-1.2, 1.2-1.3, 1.3-1.4, 1.4-1.5, or a broader range encompassing two or more of these narrower ranges.

Base 140 optionally includes, in addition to moderately-sloped platform 142, a structure disposed in the rear side of barrier 104, to further stabilize module 102 on the floor. This structure, for example, may include a pair of relatively small legs 160 extending from the rear of plate 112, and disposed further externally (namely, towards the two opposing vertical ends of barrier 104) than moderately-sloped platform 142.

Each leg 160 may be shaped as a hollow wedge which opens to the front side of barrier 104 and towards the floor. Each leg 160 may extend to a shorter horizontal distance (e.g., by 30-95%) from barrier 104 than moderately-sloped platform 142. For example, while in some configurations the horizontal length of moderately-sloped platform 142 may be between 14-20 cm, the horizontal length of each leg 160 may be between 1.5-6 cm.

As briefly discussed above, for efficient shipping and storage, modules 102 may be configured to be tightly stacked. Reference is now made to FIGS. 8A-8B, which show an exemplary stack of modules 102 in a front perspective view and a cross-sectional view, respectively. Bases 140 of the modules 102 may be configured to at least partially fit within one another, namely—underneath one another. For each base 140, both its moderately-sloped platform 142 and its legs 160 may be so configured. When modules 102 are arranged in parallel and bases 140 are inserted into one another to the full extent possible, only a minimal distance between barriers 104 remains, such as in the range of 1-10 cm, or more specifically 1-2 cm, 2-3 cm, 3-4 cm, 4-5 cm, 5-6 cm, 6-7 cm, 7-8 cm, 8-9 cm, 9-10 cm, or any broader range encompassing two or more of these narrower ranges. Multiple modules 102, such as between 10-50, may be stacked together and packaged in a box for transportation. Space remaining in the box above moderately-sloped platform 142 of the frontmost module 102 may be used for storage of connectors, for example.

Reference is now made to FIG. 9, which shows an exemplary folded fence 902 in a perspective view. As discussed above briefly, for temporary storage of an assembled fence, as well as for its convenient mobilization, the fence may be folded in a zigzag pattern until all modules 102 become parallel, with their bases at least partially fitted underneath one another. Connectors 170 that connect the various modules 102 may remain on during the folding. As discussed above and with reference to FIGS. 8A-8B, connectors 170 are configured and dimensioned such that, when modules 102 are finally arranged in parallel and bases 140 are inserted into one another to the full extent possible, only a minimal distance between barriers 104 remains, such as in the range of 1-10 cm, or more specifically 1-2 cm, 2-3 cm, 3-4 cm, 4-5 cm, 5-6 cm, 6-7 cm, 7-8 cm, 8-9 cm, 9-10 cm, or any broader range encompassing two or more of these narrower ranges. To mobilize folded fence 902, it may be lifted and carried by a pole 900 inserted through barriers 104 of all modules 102, such as through openings 120 located above the center of gravity of each module.

The assembled fence may be configured for such folding not only by virtue of the configuration and dimensions of connectors 170, but also due to the hollow configuration of pertinent parts of base 140 (such as moderately-sloped platform 142, struts 158, and legs 160), whose openings (on the barrier side) are broader than their deeper cavity regions; this allows the insertion of each part into a corresponding part of an adjacent module even when the two modules are advanced towards each other at an angle (resulting from the folding) and not in parallel.

Figures 3A, 3B:
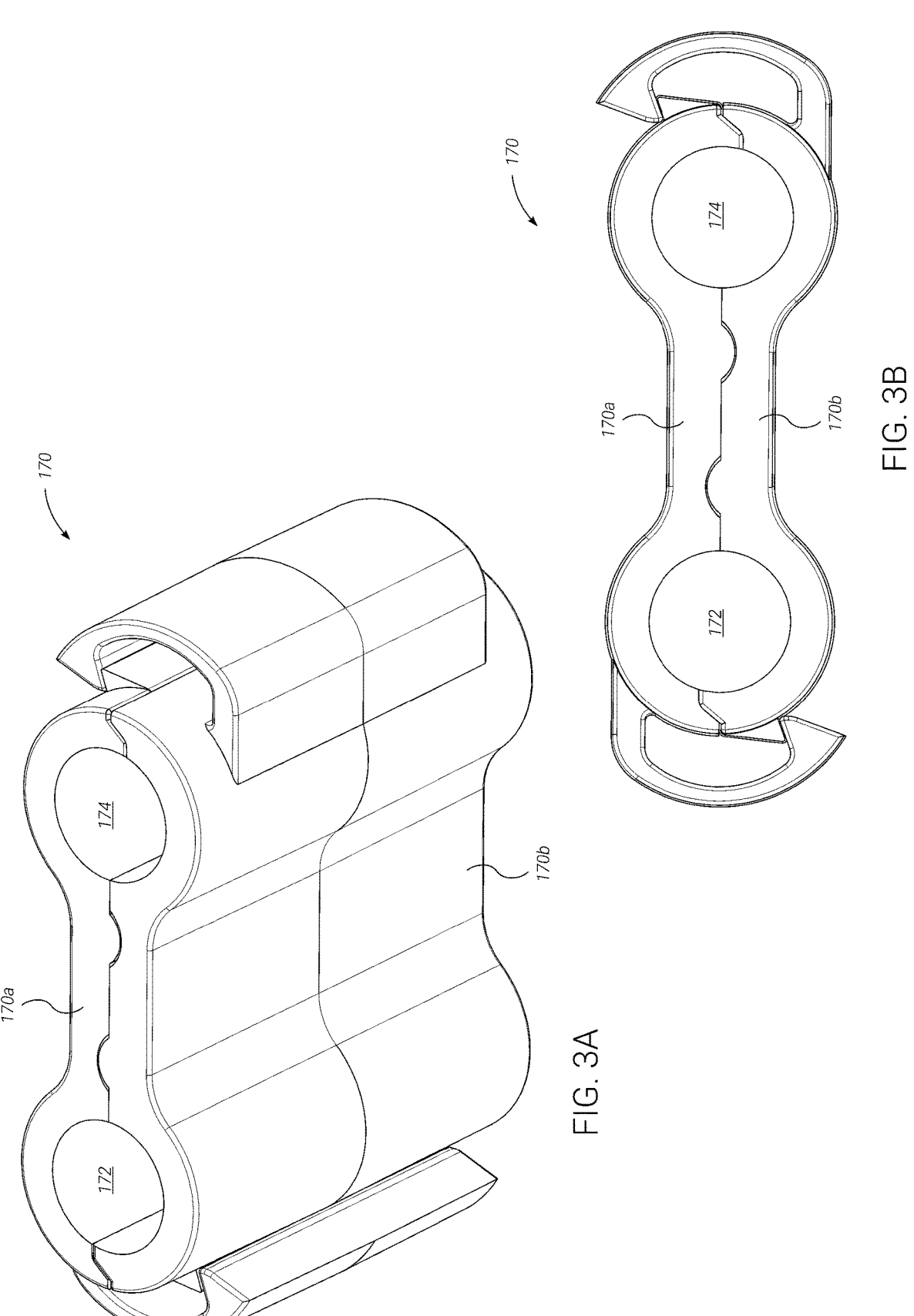
FIGS. 3A-3B show an oblique isometric view and a top isometric view, respectively, of an exemplary connector, in accordance with some embodiments.

Reference is made to FIGS. 3A-3B which show an exemplary connector 170 in oblique and top isometric views, respectively. Reference is also made to FIGS. 4A-4F, which show one half 170a of connector 170, in an isometric front view, a cross-sectional view, and two enlarged views, respectively.

Connector 170 may include two parts 170a and 170b, optionally identical, which are configured to clasp onto each other. Connector 170 is shown in a clasped (also "closed") configuration in FIGS. 3A-3B, and one of its identical halves 170a is shown and more thoroughly discussed with reference to FIGS. 4A-4F. Each of connector halves 170a and 170b may be integrally formed, for example using injection molding, of a stiff plastic such as PP, HDPE, etc.

Connector 170 may be configured as a double hinge, configured to connect two adjacent modules (not shown in these figures) in a way which allows both modules to rotate relative to the connector. To this end, connector 170, when clasped, may be configured with a pair of parallel internal channels 172 and 174 (namely, the central, longitudinal axes of these two channels are parallel) which are defined between the connector's two halves 170a and 170b, with each half defining, for example, a half of each channel. Channels 172 and 174 may each be configured as a tubular channel, with each of halves 170a and 170b defining a substantially half-cylindrical concavity 172a and 174a, respectively.

Each of channels 172 and 174 may be configured to embrace an end post (not shown in these figures) of one of the two adjacent modules. To this end, each of channels 172 and 174 may have an inner diameter, along its length, which is slightly larger than that the outer diameter of each end post (e.g., by 0.4-2 mm, or more specifically by 0.4-0.5 mm, 0.5-0.6 mm, 0.6-0.7 mm, 0.7-0.8 mm, 0.8-0.9 mm, 0.9-1 mm, 1-1.1 mm, 1.1-1.2 mm, 1.2-1.3 mm, 1.4-1.5 mm, 1.5-1.6 mm, 1.6-1.7 mm, 1.7-1.8 mm, 1.8-1.9 mm, 1.9-2 mm, or any broader range encompassing two or more of these narrower ranges), to allow the end post to pivot inside its channel but without significant free play. Alternatively, if more free play is desired, the inner diameter of channels 172 and 174 may larger than the values listed above.

Externally, connector 170 may be generally shaped as an elongated 8-shaped profile, with walls whose thickness is configured to endow the connector with sufficient structural strength to withstand typical forces that are expected to be applied to the assembled fence, without breakage or separation of the two clasped halves 170a and 170b.

Between the two half-channels 172a and 174a, the body of connector half 170a may extend to a length 176 which defines the resulting distance between the end posts of the two connected modules. This length 176 may be sufficient to allow folding of the assembled fence as shown in FIGS. 9, namely—that length may be equal or similar to the desired distance between the barriers of adjacent modules when the fence is fully folded and the modules are parallel.

The body of connector half 170a may include a structure configured to prevent sliding of the two connector halves over each other, which may result in their unintentional unclasping. This structure, for example, may include two parallel sets, inversely-oriented, of protrusion and depression, which sets may be disposed in the length 176 of connector half 170a in between half-channels 172a and 174a, and have a longitudinal dimension that is parallel to the central longitudinal axes the half-channels: A first set in which a protrusion 178a is disposed in a lower region of connector half 170a, and a depression 178b is disposed in an upper region of the connector half. A second set in which a protrusion 180a is disposed in the upper region of the connector half, and a depression 180b is disposed in the lower region of the connector half Each of protrusions 178a and 180a may be shaped as a horizontal cylindrical segment protruding from an internal (substantially planar) surface 184 of connector half 170a, extending from the lower or upper end, respectively, of the connector half, and terminating slightly (e.g., 0.3-0.7 mm) above a middle 182 of the connector half's height.

Each of depressions 178b and 180b, in turn, may be shaped as a horizontal cylindrical segment depressed into internal surface 184 of connector half 170a, extending from the upper or lower end, respectively, of the connector half, and terminating slightly (e.g., 0.3-0.7 mm) below the middle 182 of the connector half's height. Each of depressions 178b and 180b may be configured to receive therein protrusion 180a or 178a, respectively, when connector 170 is clasped. The fact that each of depressions 178b and 180b extends to slightly beyond the middle 182 of the connector half's height makes the manual joining of the two connector halves more convenient, not requiring fine manual operation to fit the protrusions in the depressions.

The two connector halves 170a and 170a may be clasped together using a latch 186 which latches onto a wedge 188. Latch 186 and wedge 188 may be disposed on two opposing sides of connector half 170*a*, such as over the circular walls encompassing half-channels 172*a* and 174*a*.

Figures 4A, 4B:
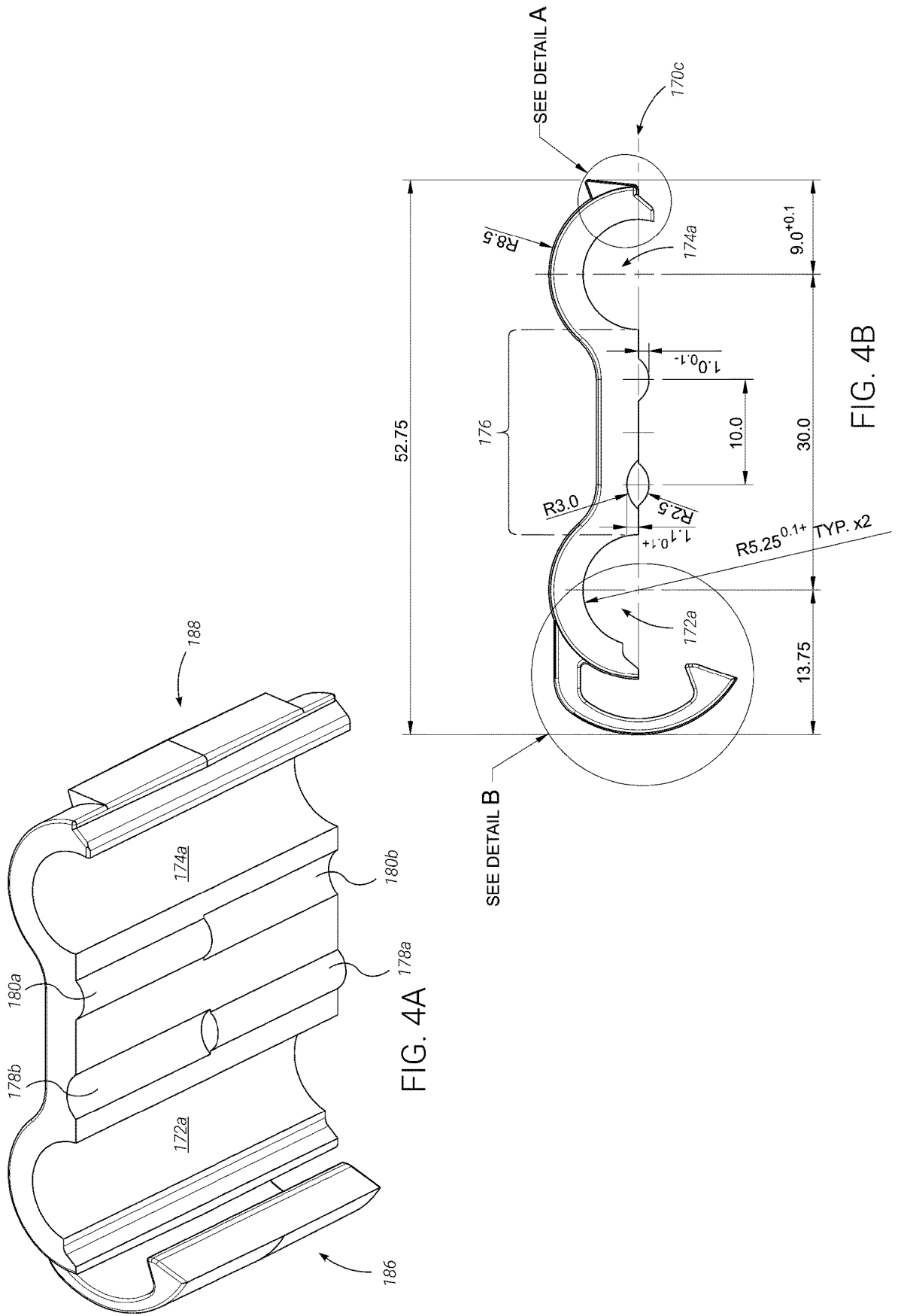
FIGS. 4A-4F show an oblique isometric view, a top isometric view, a front isometric view, a cross-sectional view, and two enlarged views, respectively, of an exemplary connector, in accordance with some embodiments.
Figure 4D:
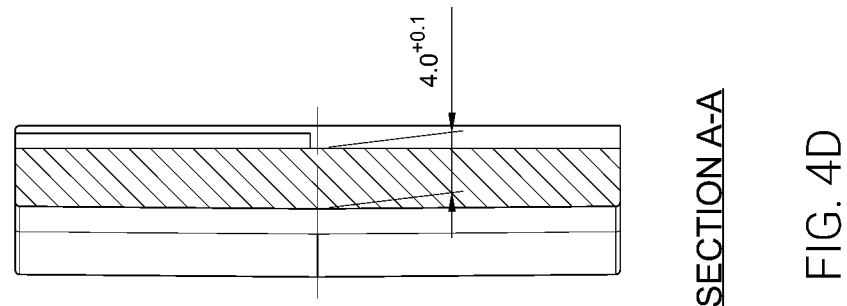
Figure 4C:
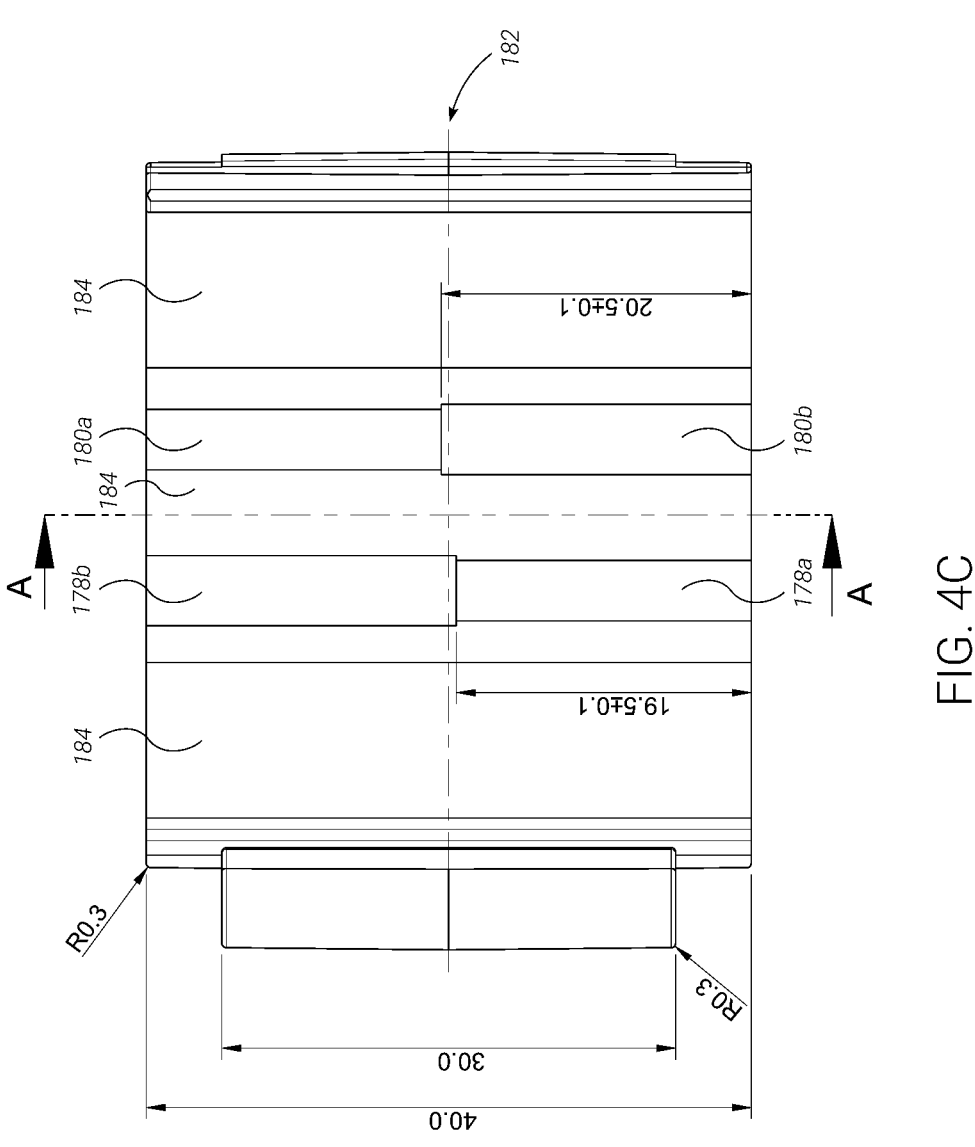
Figure 4F:
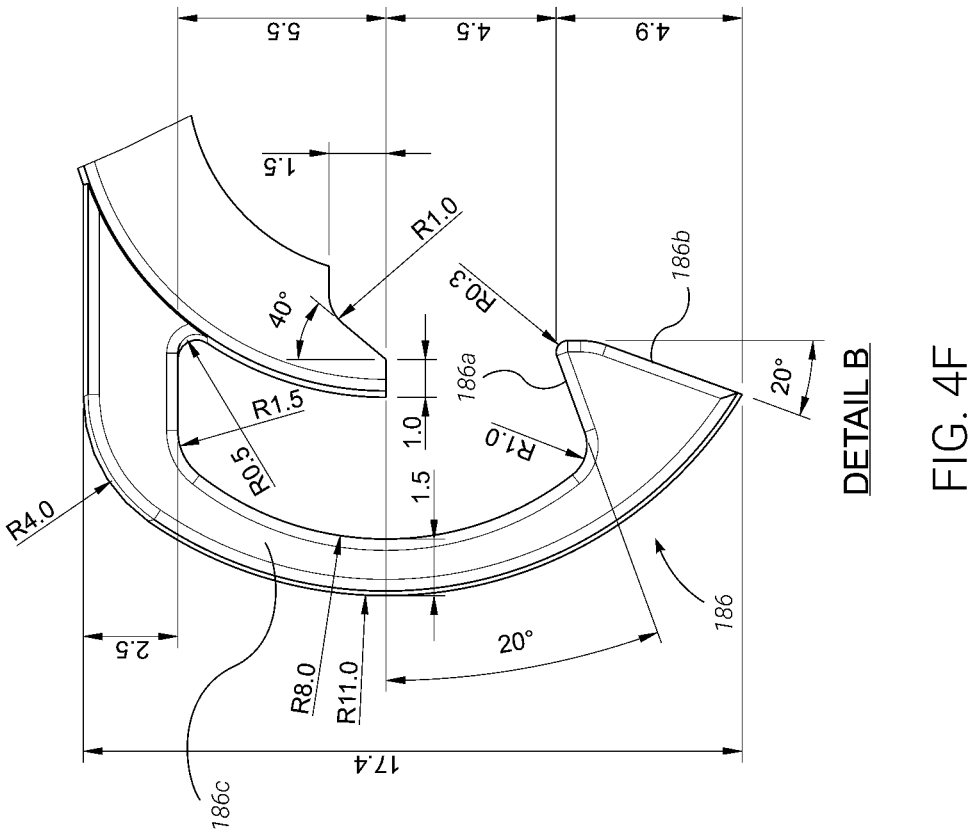
Figure 4E:
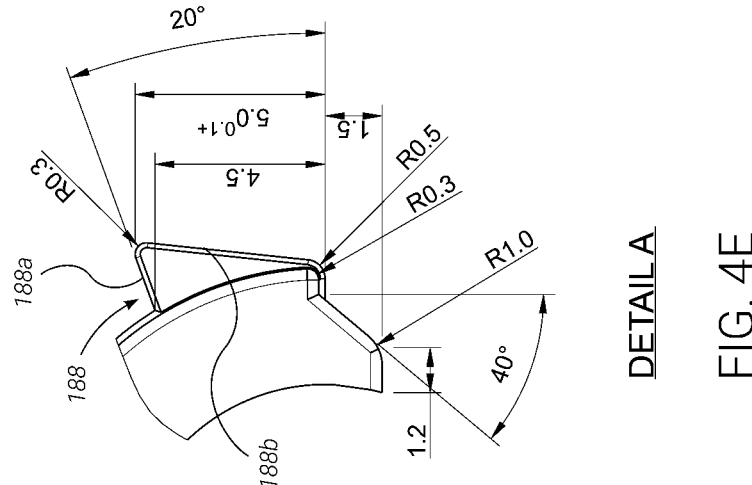

With specific reference to FIG. 4E, wedge 188 may be shaped as a triangular prism extending over at least a portion of the height of connector half 170*a*. With specific reference to FIG. 4F, latch 186 may be shaped as a concave arm extending over at least a portion of the height of connector half 170*a*. One side 188*a* of wedge 188 may be sloped at an angle of 15-25°, for example, relative to a face plane 170*c* of connector half 170*a*, matching a similar slope of an inner surface 186*a* of latch 186. When the two connector halves 170*a* and 170*a* are pushed against each other, latch 186 will slightly retract outwardly as its outer sliding surface 186*b* slides over an outer sliding surface 188*b* of wedge 188, until these two sliding surfaces slide off of each other and the latch springs back inwardly, to make inner surface 186*a* of latch 186 engage side 188*a* of wedge 188, locking them together due to their slopes.

Figures 5A, 5B, 5C:
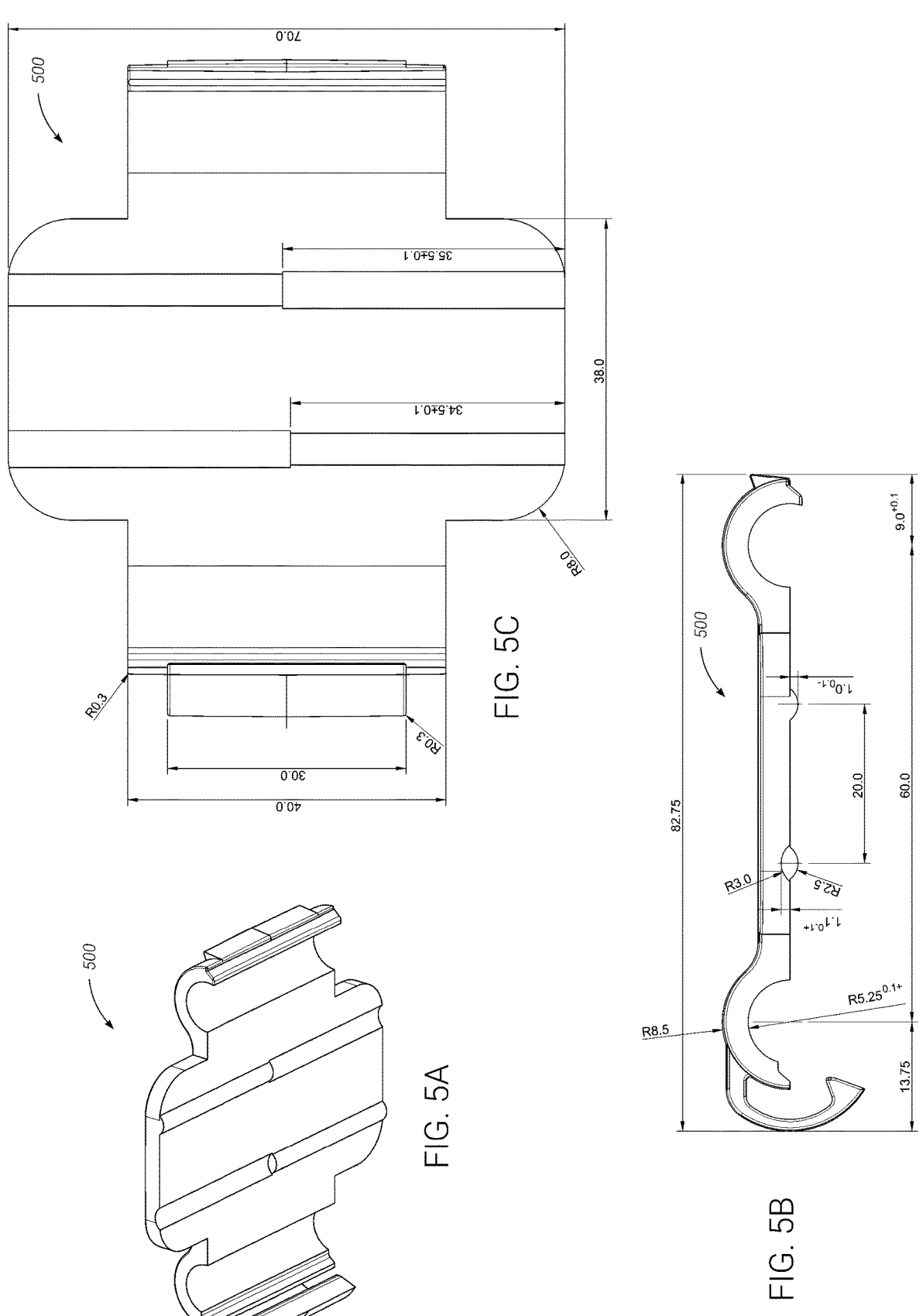
FIGS. 5A-5C show an oblique isometric view, a top isometric view, and a front isometric view, respectively, of another exemplary connector, in accordance with some embodiments.

Reference is now made to FIGS. 5A-5C, which show a half of another exemplary connector 500 in an oblique isometric view, top isometric view, and front isometric view, respectively. Connector half 500 may be similar to connector half 170*a* of FIGS. 4A-4F, except for having a wider and taller body in between its two tubular channels.

The wider body, namely—the increased distance between the two tubular channels, may make this wider connector suitable for connecting two modules over a space where an object, such as a pipe, has to cross the assembled fence. The width of the body may be designed to be greater than an outer diameter of the pipe. However, this relatively large space between the adjacent modules may be exploited by animals or humans to pass through the fence. Accordingly, connector half 500 may also be configured with a taller body, extending upwardly and downwardly beyond the height of the tubular channels, whose height may be limited to a vertical space between two rails of the module, where each channel embraces the end post of the module.

Reference is now made to FIG. 6, which shows a front perspective view of a pipe 600 crossing an exemplary assembled fence, between two adjacent modules 102. Two or more connectors 500*a* and 500*b*, each assembled from a pair of connector halves 500 of FIGS. 5A-5C, may be assembled at different heights between modules 102, so that animal passage is physically blocked by the connectors themselves. If desired, one or more additional such connector may be assembled over pipe 600, to further block the space between modules 102 (but this option is not shown in the figure). As shown, the height of the body of each of connectors 500*a* and 500*b* may be similar to (e.g., between 0.5-1.5 cm less than) the distance between the central axes of every two adjacent rails of modules 102, to allow for room to assemble multiple such connectors directly over each other. Optionally, the one or more connectors (e.g., connectors 500*a* and 500*b*, and optionally one or more additional connectors) that are assembled between two adjacent modules 102, below and/or over pipe 600, are dimensioned, overall, to block at least 70%, 80%, or 90% of the vertical space between the ground (or the lower end of the module 102) and pipe 600, and optionally also at least 20%, 40%, 60%, 80%, or 90% of the vertical space between pipe 600 and the upper ends of the adjacent modules 102.

Reference is now made to FIGS. 7A-7B, which show a front perspective view and a top isometric view, respectively, of an exemplary assembled fence with two partially-overlapping fence modules 102*a* and 102*b*. As briefly discussed above, the modular fence assembly may be configured to enable an overlapping connection of two adjacent fence modules, such as modules 102*a* and 102*b*, in order to shorten the length of a certain fence segment given a certain constraint.

By way of example, a pipe 700 may be disposed at a certain fixed location (e.g., in a poultry house), and a fence may be assembled with a suitable space 702 between module 102*b* and module 102*c* to accommodate passage of that pipe. However, the distance from the right side of pipe 700 to a location where the fence has to terminate, such as a wall of the poultry house, may not fit a whole number of modules (serially connected by connectors). In such a scenario, two modules 102*a* and 102*b* of the fence segment that needs shortening may be connected in a partially overlapping fashion: The modules may be positioned back-to-back, with their barriers parallel. Then, one or more connectors (such as four connectors 704*a-d* shown merely as an example) may each be used to embrace an internal picket (namely, not an end post) of one module and an internal picket or an end post of the other module.

When the modular fence assembly is used as a poultry migration fence in a poultry house, there could be multiple pipes extending (typically in parallel) along the poultry house, sometimes relatively close to the floor (e.g., between 15-40 cm above the floor). Advantageously, the modular fence assembly may allow to conveniently assemble a modular poultry migration fence which satisfies the physical constraints posed by these pipes and optionally also by other structures of the poultry house, such as its peripheral walls.

In the description and claims, each of the terms "substantially," "essentially," and forms thereof, when describing a numerical value, means up to a 20% deviation (namely, ±20%) from that value; similarly, when such a term describes a numerical range, it means an up to 20% broader range (10% on each side of the range). Additionally, when each of the terms "substantially," "essentially," and forms thereof is used to describe a geometrical term defining an angle (such as "perpendicular," "orthogonal," "parallel," "planar," "co-planar," "co-axial," "horizontal," "vertical," etc.), it means up to a 25 degrees deviation (namely, ±25°) from that angle, or more specifically up to ±10°, ±15°, or ±20°. This applies, inter alia, to the aforementioned end posts, pickets, barrier, module, and any other element mentioned in association with such geometrical term.

The description of a numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. Similarly, description of a range of fractions from 0.6 to 1.1 should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example, 0.6, 0.7, 0.8, 0.9, 1, and 1.1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference, it is hereby intended that the present description controls.

What is claimed is:

1. A modular fence assembly, comprising:
multiple fence modules each comprising:
- a barrier comprising a pair of substantially parallel end posts, and
- a base integrally formed with said barrier, and comprising a substantially planar structure disposed substantially orthogonally to said barrier and extending from at least a first side of said barrier, to a length from said first side of said barrier equal to between 25% and 100% of a height of said barrier, thereby said base is configured to:
  - stabilize the respective fence module on a surface,
  - allow an animal or a human to stand, sit, or crawl on the substantially planar structure, such that, if the animal or human push or lean with force against said barrier while dwelling on the substantially planar structure, the body weight of the animal or human counteracts the pushing or leaning force and does not allow the fence module to topple over, and
- a pair of legs extending from an opposite side of said barrier, peripherally of where said base extends from said barrier; and
multiple connectors each configured to connect two adjacent fence modules of said multiple fence modules, wherein:
- each of said multiple connectors is configured as a double hinge having a pair of parallel internal channels, and
- each of said internal channels is configured to embrace an end post of one of the two adjacent fence modules;
wherein said multiple fence modules and said multiple connectors are configured to be assembled into a fence.

2. The modular fence assembly of claim 1, wherein:
each of said internal channels of said connector is a tubular channel; and
each of said end posts of said barrier has a circular profile configured to pivot inside said tubular channel.

3. The modular fence assembly of claim 1, wherein:
said barrier comprises a lattice having multiple pickets that are disposed substantially parallel to said end posts; and
each of said internal channels of said connector is further configured to embrace a picket of said barrier.

4. The modular fence assembly of claim 1, wherein:
said substantially planar structure extends to a length from the first side of said barrier equal to between 35% and 50% of the height of said barrier.

5. The modular fence assembly of claim 1, wherein:
said substantially planar structure comprises a moderately-sloped platform extending downwardly from the first side of said barrier, wherein said moderately-sloped platform comprises one or more lower edges configured to engage the surface on which said fence module is positioned; and
said bases of said multiple fence modules are configured to at least partially fit underneath one another when said multiple fence modules are stacked.

6. The modular fence assembly of claim 1, wherein:
said multiple fence modules and said multiple connectors are configured to be assembled into a fence by serially connecting said multiple fence modules using said multiple connectors, wherein, in the series, said multiple fence modules alternate between having the base extending to one side of the fence and having the base extending to an opposite side of the fence.

7. The modular fence assembly of claim 1, wherein:
said multiple fence modules and said multiple connectors are configured to be assembled into a fence by serially connecting said multiple fence modules using said multiple connectors, wherein, in the series, said multiple fence modules have their bases extending to a same side of the fence.

8. The modular fence assembly of claim 1, wherein:
each of said multiple connectors is configured such that, when the assembled fence is folded in a zigzag pattern until all fence modules become parallel, with their bases at least partially fitted underneath one another, there is a maximal space between every two adjacent fence modules of no more than 1-10 centimeters.

9. The modular fence assembly of claim 8, wherein a length between the pair of parallel internal channels of each of said multiple connectors is between 1-10 centimeters.

10. The modular fence assembly of claim 8, wherein the substantially planar structure of said base is disposed at an angle of 90°-115° relative to said barrier.

11. A method for using the modular fence assembly of claim 1 as a poultry migration fence, the method comprising:
assembling the modular fence assembly into a fence inside a poultry house, while allowing food pipes and/or water pipes of the poultry house to pass between adjacent fence modules of the fence.

12. The method of claim 11, wherein:
one or more of the connectors that connect adjacent fence modules that have one of the pipes pass therebetween, are dimensioned, overall, to block at least 70% of a vertical space between the ground of the poultry house and the respective food pipe, such that the one or more connectors physically block passage of poultry between the adjacent fence modules that have one of the pipes pass therebetween.

13. The method of claim 11, wherein:
one or more of the connectors that connect adjacent fence modules that have one of the pipes pass therebetween, are dimensioned, overall, to block at least 40% of a vertical space between the respective food pipe and upper ends of the respective adjacent fence modules, such that the one or more connectors physically block passage of poultry between the adjacent fence modules that have one of the pipes pass therebetween.

* * * * *